United States Patent [19]

Dubreuil et al.

[11] Patent Number: 5,566,767
[45] Date of Patent: Oct. 22, 1996

[54] FLEXIBLE TOOTH WITH INTERCHANGEABLE ELEMENTS FOR A PLOWING APPARATUS

[75] Inventors: Jean Dubreuil, Ambert; Gerard Dubreuil, Saint-Etienne; Joseph Masson, Saint Chamond, all of France

[73] Assignee: Manufacture De Ressorts De Terrenoire, Saint Etienne, France

[21] Appl. No.: 397,110

[22] PCT Filed: Mar. 14, 1994

[86] PCT No.: PCT/FR94/00272

§ 371 Date: Jul. 17, 1995

§ 102(e) Date: Jul. 17, 1995

[87] PCT Pub. No.: WO94/21105

PCT Pub. Date: Sep. 29, 1994

[30] Foreign Application Priority Data

Mar. 15, 1993 [FR] France ................ 93 03232

[51] Int. Cl.⁶ ........................................ A01B 35/24
[52] U.S. Cl. ................................. 172/708; 172/643
[58] Field of Search ....................... 172/705, 264, 172/643, 707, 708, 711, 621, 763

[56] References Cited

U.S. PATENT DOCUMENTS

| 417,746 | 12/1889 | Shank | 172/707 |
|---|---|---|---|
| 565,505 | 8/1896 | Publow | 172/707 |
| 1,746,092 | 2/1930 | Sutton . | |
| 1,992,313 | 2/1935 | Langley . | |
| 3,737,156 | 6/1973 | Ward . | |
| 4,079,790 | 3/1978 | Guttler | 172/707 X |
| 5,007,484 | 4/1991 | Johanson . | |

FOREIGN PATENT DOCUMENTS

| 11012 | of 1928 | Australia | 172/708 |
|---|---|---|---|
| 41583 | 1/1930 | Denmark | 172/708 |
| 1306144 | 9/1962 | France . | |
| 2111352 | 6/1972 | France . | |
| 1120197 | 12/1961 | Germany | 172/708 |
| 2352262 | 6/1975 | Germany | 172/708 |
| 3409033 | 9/1985 | Germany | 172/708 |
| 946723 | 1/1964 | United Kingdom . | |
| 1025413 | 4/1966 | United Kingdom . | |

*Primary Examiner*—Terry Lee Melius
*Assistant Examiner*—Christopher J. Novosad
*Attorney, Agent, or Firm*—Oliff & Berridge

[57] ABSTRACT

A flexible tooth of a tilling device includes several flat "e" shaped blades mounted side by side, one end of the blades being attached to a cross member of the tilling implement, the other ends of the blades being attached to a downwardly extending arm that holds a replaceable tool. The flexible tooth allows the tool to move upward or sideways to circumvent obstacles buried in the ground. The flexible tooth may include a reinforcing blade mounted on the cross member and having an upper curved portion that contacts an upper inner portion of the "e" shaped blades after they have flexed a certain amount to impart greater rigidity to the flexible tooth. The reinforcing blade may also include a lower curved portion that contacts the downwardly extending arm to further increase the rigidity of the flexible tooth.

19 Claims, 2 Drawing Sheets

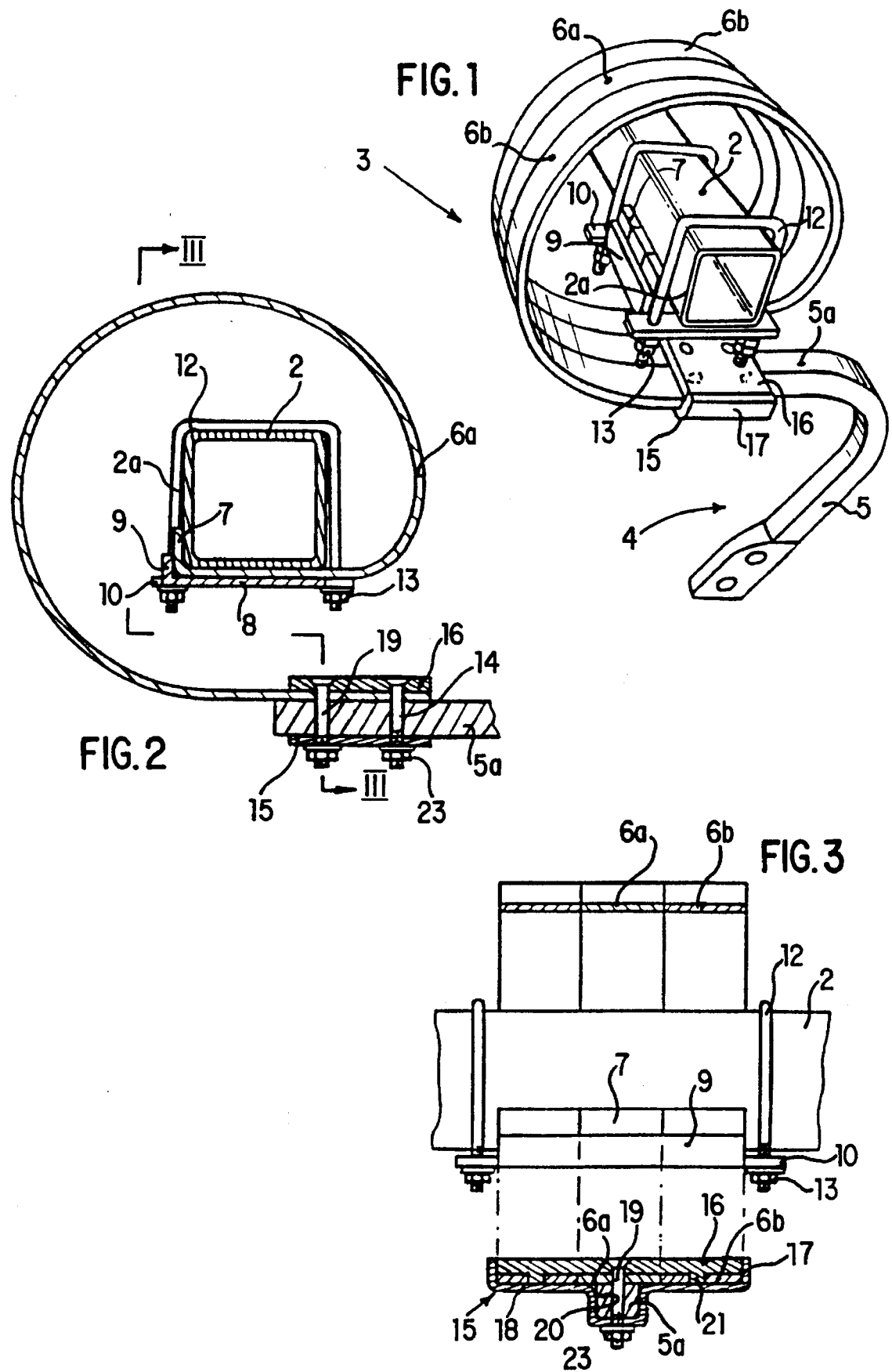

FLEXIBLE TOOTH WITH INTERCHANGEABLE ELEMENTS FOR A PLOWING APPARATUS

BACKGROUND

When tilling the soil, the use of tilling implements with flexible teeth or rigid teeth mounted on spring-loaded articulations is known.

In the implements known as cultivators, used for loosening the soil, this flexibility is put to use to achieve better loosening using the vibrations of the teeth, but also for freeing the teeth by elastic retraction when they encounter obstacles such as pebbles, stones, branches, etc.

British Patent GB-A-1,025,413 describes a tooth of this type comprising:

- a flexible e-shaped element whose upper end is attached to a cross member of the tilling implement by means of clamps,
- a bent arm whose upper part is connected with the end of the flexible element by a U-shaped body whose interior has a recess for receiving this part,
- and a tooth attached to the free end of the arm.

In practice, the flexibility of the teeth allows them to retract backward describing, in a vertical plane, a release path that gradually raises the active part above the obstacle, then, once the obstacle is past, to return by elasticity to their initial working position. In very stony soil, the teeth more frequently encounter obstacles which, by reason of the only release option being upward, tend to raise them too often, thus altering the quality of work.

Another drawback of this type of tooth is that, under the influence of the vibrations and bending of the blades, their means of removable attachment to the tilling implement and to the tools eventually becomes loose, leading to loss or breakage of elements and hence to lost time.

SUMMARY OF THE INVENTION

One of the objectives of the invention is to furnish a flexible tooth for a tilling implement, that adopts a vertical upward release path only for obstacles that cannot be circumvented, thus providing better work in soil that is stony or has many stumps.

Another objective of the invention is to furnish means of attaching the flexible element to the tilling implement and means of connecting this flexible element with a tooth, allowing interchangeability of one of the elements, which means are simple and not cumbersome while ensuring reliable connection of the elements under any operating condition of the implement.

For this purpose, in the flexible tooth according to the invention, the flexible element comprises several flexible blades which are disposed side by side so that their narrow edges are in contact, each blade having a curved upper end, the blades being connected to each other:

- in the area where they are attached to the implement, by a lower plate with an L-shaped cross section pressing the curved ends of the blades against the lower forward angle of a cross member under the clamping effect of clamps,
- and in the vicinity of the arm of the tool:
  - by a U-shaped body having legs that transversely grip the free ends of the blades,
  - by a tightening plate inserted between the two legs of the body,
  - by tenons projecting from one of the two elements, body or plate, and engaging holes provided at least in the side blades,
  - and by mounting bolts traversing the tightening plate, the center blade, the arm of the tool, and the interior of the body.

Thus, to supplement its vertical retraction option, the tooth has transverse flexibility enabling it to attempt to circumvent obstacles before rising, which improves the quality of the work.

Because of their positive mounting, the blades of which the flexible part of the tooth are composed are held in a torsionally rigid manner and there is no risk of their tangling with each other and losing their efficiency when the tooth moves.

Also, it is possible very rapidly and easily to replace the active part of each tooth by acting only on the bolts that attach the tooth to the ends of the blades.

DESCRIPTION OF THE DRAWINGS

The invention will in any event be better understood from the description which follows with reference to the attached drawing figures that show, as a nonlimiting example, one embodiment of this tooth, in the case when it has three blades.

FIG. 1 is a perspective view of an embodiment of the invention;

FIG. 2 is a cross-sectional view showing the attaching means of the blade ends in greater detail;

FIG. 3 is a cross-sectional view along III—III in FIG. 2;

DETAILED DESCRIPTION OF PREFERRED EMBODIMENTS

Figure 4:
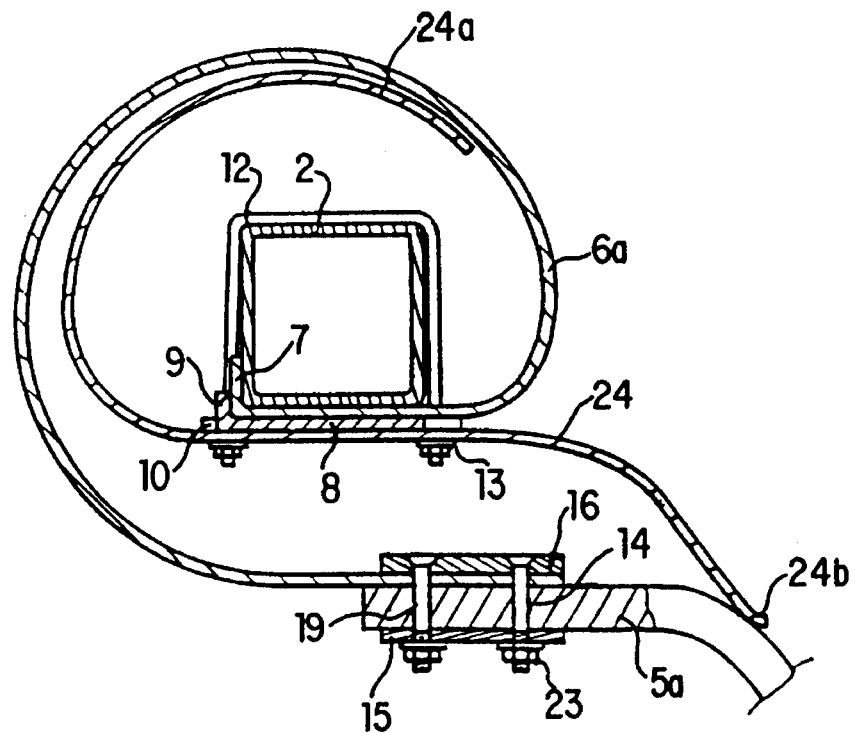
FIG. 4 is a view similar to FIG. 3 showing one embodiment of this tooth.

In the FIGS., numeral 2 designates a cross member of a tilling implement, 3 designates a flexible element, and 4 an active element comprised of an arm 5 carrying a tool, not shown.

The flexible element is comprised of several blades, for example three blades, including a center blade 6a and side blades 6b, made of spring steel and curved into an "e" shape. These blades are disposed side by side so that their narrow edges are in contact.

At its upper end that comes in contact with cross member 2, and as shown in greater detail in FIG. 2, each blade 6a–6b is bent at 7 so that it can wedge itself translationally against the lower part of front face 2a of cross member 2. The ends of the three blades are pressed against the lower face of cross member 2 by a lower plate 8 which has, locally, a bent return 9 pressing bent returns 7 of the blades against cross member 2. This bent return extends transversely on the center part of the front edge of the plate and is bordered laterally by two legs 10 serving to attach one of the two legs of two threaded clamps 12, fitted over cross member 2. It can easily be seen that the tightening of nuts 13, attached to the threaded ends of clamps 12, causes the interiors of the clamps to be pressed against the cross member, and, by acting on plate 8, causes the ends of blades 6a–6b to be pinched between this plate and cross member 2.

Thus attached, the ends of the blades are wedged in lengthwise translation by their bent returns 7 abutting cross member 2 and, in transverse translation, by the two clamps 12 which surround them.

This simple and non-cumbersome device ensures excellent attachment, while allowing rapid disassembly when any of the flexible blades has to be replaced.

At its other end, each of blades 6a–6b is traversed by two aligned bores 14 and is inserted between a body 15 and a tightening plate 16.

As shown in greater detail in FIG. 3, body 15 has in cross section the general shape of a U whose legs 17 are separated by a gap corresponding to the width of three blades and whose height is equal to the thickness of these blades, plus at least the thickness of plate 16. In its center part, interior 18 of body 15 has a lengthwise stamped groove forming a recess 20 for end 5a of arm 5 of active element 4. The two lateral blades 6b are positioned lengthwise by introduction, into their bores 14, of tenons 21 projecting from plate 16. Center blade 6a is positioned lengthwise by engagement, in its bores 14, of bolts 19 passing through plate 16, the end 5a of the arm 5, and the bottom of stamped groove 20 of the body 15 to receive least one retaining nut 23.

Figure 5:
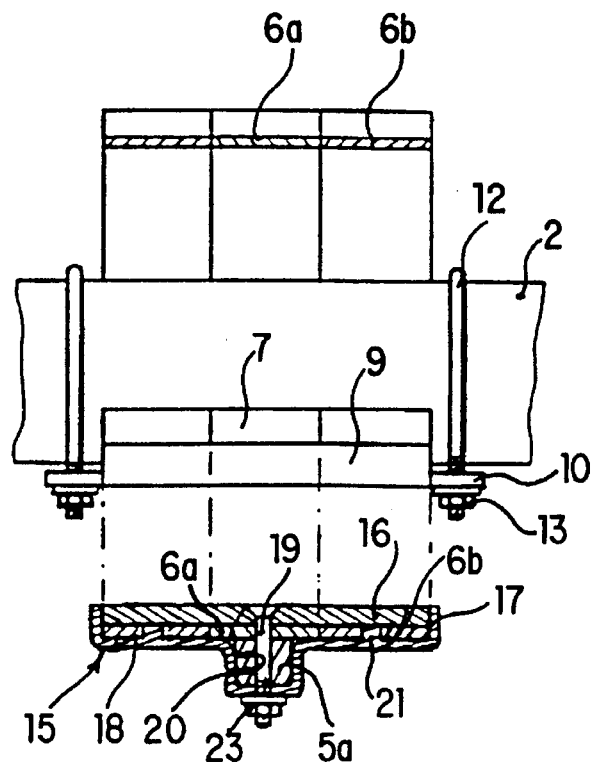
FIG. 5 is a cross-sectional view along III—III in FIG. 2.

In one embodiment, as shown in FIG. 5, the tenons cooperating with the bores 14 of the side blades, project from the bottom of the interior 18 of the body 15.

It emerges from the foregoing that the lengthwise translational attachment and transverse translational attachment of the ends of the blades to the body 15, but also to the arm 5, is provided by two bolts 19, namely by a simple, non-cumbersome, reliable, and safe attachment allowing interchangeability of the active element.

Because of their firm attachment, both transversely and lengthwise, to the tool and to cross member 2 respectively, blades 6a and 6b operate under good conditions and can hence deform by twisting transversely independently of each other without interfering with each other or tangling, thus allowing the lateral freeing of the tool, limiting the degree of vertical freeing.

As shown in FIG. 4, for arduous working conditions, the blades of the flexible tooth described above are reinforced by an elastic stop blade 24 made of the same material as the blades 6a–6b. This stop blade 24 is attached beneath plate 8 and has an upper curve 24a whose concavity is open rearward and is accommodated inside the corresponding blade, and a lower curve 24b whose concavity faces forward and rests on the elbow of arm 5. When the tool is subjected to a high reaction force pulling it backward, the loops of the "e" of blades 6a, 6b close according to a first law of elasticity. They then come in contact with upper curve 24a of the elastic stop, which causes their pivot point to move and leads to a second law of elasticity, with variable flexibility by displacement of the contact point of blades 6a, 6b on blade 24.

Lower curve 24b in contact with arm 5 adds its reinforcing effects.

The latter curve 24b can be eliminated in certain applications.

At rest, the ends of blade 24 may be at a distance from the facing parts of blades 6a–6b and of arm 5.

Additional elastic blade 24 can also be used as a reinforcement in cases when the flexible tooth is reduced to a single blade of similar shape combining flexible element 6 and tool arm 5 in one and the same part.

What is claimed is:

1. A flexible tooth for a tilling implement, comprising:
    a plurality of flexible "e" shaped blades, the plurality of blades being mounted side by side so that longitudinal sides of the blades are adjacent one another, the plurality of blades having first ends that are attachable to a cross member of a tilling implement;
    a curved arm having a first end that is attachable to second ends of the plurality of blades and a second end that is attachable to a replaceable tool;
    a first connecting device for connecting the first ends of the plurality of blades to the cross member of the tilling implement; and
    a second connecting device for connecting the second ends of the plurality of blades to the first end of the curved arm, the second connecting device comprising:
        a U-shaped body having a channel for receiving the first end of the curved arm and having legs for receiving and surrounding the second ends of the plurality of blades,
        a tightening plate that is insertable between the legs of the U-shaped body so that the second ends of the plurality of blades are interposed between the tightening plate and the U-shaped body, and
        at least one bolt that is passable through the tightening plate, at least one of the plurality of blades, the first end of the curved arm, and the U-shaped body to attach the second ends of the plurality of blades to the first end of the curved arm.

2. The flexible tooth according to claim 1, wherein each of the plurality of blades has at least one aperture in the second end thereof, and wherein the second connecting device further comprises at least one tenon that projects from at least one of the tightening plate and the U-shaped body, the at least one tenon being insertable into the at least one aperture of at least one of the plurality of blades.

3. The flexible tooth according to claim 2, wherein the plurality of blades comprise a middle blade and two side blades, the side blades being arranged on opposite sides of the middle blade.

4. The flexible tooth according to claim 3, wherein the at least one bolt is passable through the at least one aperture in the middle blade, and wherein the at least one tenon comprises at least two tenons, each of the at least two tenons being insertable into the at least one aperture of a side blade.

5. The flexible tooth according to claim 2, wherein the at least one tenon projects from the tightening plate.

6. The flexible tooth according to claim 2, wherein the at least one tenon projects from the U-shaped body.

7. The flexible tooth according to claim 2, wherein the at least one tenon comprises a plurality of tenons that project from the tightening plate and the U-shaped body.

8. The flexible tooth according to claim 1, wherein the first end of each of the plurality of blades has an L-shaped bent portion that conforms to the shape of a lower front exterior corner of the cross member of the tilling implement, and wherein the first connecting device comprises:
    an L-shaped plate that conforms to the shape of the L-shaped bent portions of the first ends of the plurality of blades so that the first ends of the plurality of blades may be interposed between the lower front exterior corner of the cross member and the L-shaped plate; and
    at least two clamps for surrounding the cross member and the L-shaped plate to attach the first ends of the plurality of blades to the cross member.

9. The flexible tooth according to claim 8, further comprising a reinforcing blade attached to the L-shaped plate and having an upper curved portion that extends into an upper inside portion of the plurality of blades, the upper curved portion having a concavity that opens toward the rear of the flexible tooth.

10. The flexible tooth according to claim 9, wherein the reinforcing blade further comprises a lower curved portion that rests on an outside curved portion of the curved arm, the lower curved portion having a concavity that opens toward the front of the flexible tooth.

11. The flexible tooth according to claim 1, wherein the first end of each of the plurality of blades has an L-shaped bent portion that conforms to the shape of a lower front exterior corner of a cross member of a tilling implement, and wherein the first connecting device comprises:

an L-shaped plate that conforms to the shape of the L-shaped bent portions of the first ends of the plurality of blades so that the first ends of the plurality of blades may be interposed between the lower front exterior corner of the cross member and the L-shaped plate; and at least two clamps for surrounding the cross member and the L-shaped plate to attach the first ends of the plurality of blades to the cross member.

12. The flexible tooth according to claim 1, further comprising a reinforcing blade attached to the cross member of the tilling implement and having an upper curved portion that extends into an upper inside portion of the plurality of blades, the upper curved portion having a concavity that opens toward the rear of the flexible tooth to form a substantially closed loop with the upper inside portion of the plurality of blades.

13. The flexible tooth according to claim 12, wherein the reinforcing blade further comprises a lower curved portion that rests on an outside curved portion of the curved arm, the lower curved portion having a concavity that opens toward the front of the flexible tooth.

14. A flexible tooth for a tilling implement, comprising:

a plurality of flexible "e" shaped blades having first and second lateral sides, a top side and a bottom side, wherein the first and second lateral sides are narrower than the top and bottom sides, wherein the blades are mounted side by side so that the lateral sides of the blades face one another, and wherein the plurality of blades have first ends that are attachable to a cross member of a tilling implement;

a curved arm having a first end that is attachable to second ends of the plurality of blades and a second end that is attachable to a replaceable tool;

a first connecting device for connecting the first ends of the plurality of blades to the cross member of the tilling implement; and a second connecting device for connecting the second ends of the plurality of blades to the first end of the curved arm.

15. The flexible tooth according to claim 14, wherein the second connecting device comprises:

a U-shaped body having a channel for receiving the first end of the curved arm and having legs for receiving and surrounding the second ends of the plurality of blades;

a tightening plate that is insertable between the legs of the U-shaped body so that the second ends of the plurality of blades are interposed between the tightening plate and the U-shaped body; and means for fastening the tightening plate to the U-shaped body so that the first end of the curved arm is attached to the second ends of the plurality of blades.

16. The flexible tooth according to claim 15, wherein each of the plurality of blades has at least one aperture in the second end thereof, wherein the second connecting device further comprises at least one tenon that projects from at least one of the tightening plate and the U-shaped body, and wherein the at least one tenon is insertable into the at least one aperture of at least one of the plurality of blades.

17. The flexible tooth according to claim 15, wherein the fastening means comprises at least one member that is passable through the U-shaped body, the tightening plate and at least one of the plurality of blades.

18. A flexible tooth for a tilling implement, comprising:

a plurality of flexible "e" shaped blades that are attachable to a cross member of a tilling implement, wherein the plurality of blades are mounted side by side so that longitudinal sides of the blades are adjacent one another, and wherein each of the plurality of blades have a first end with an L-shaped bent portion that conforms to the shape of a lower front exterior corner of the cross member of the tilling implement;

a curved arm having a first end that is attachable to second ends of the plurality of blades and a second end that is attachable to a replaceable tool;

a first connecting device for connecting the first ends of the plurality of blades to the cross member of the tilling implement, the first connecting device comprising:

an L-shaped plate that conforms to the shape of the L-shaped bent portions of the first ends of the plurality of blades so that the first ends of the plurality of blades may be interposed between the lower front exterior corner of the cross member and the L-shaped plate, and means for clamping the L-shaped plate and the first ends of the plurality of blades to the cross member; and a second connecting device for connecting the second ends of the plurality of blades to the first end of the curved arm.

19. The flexible tooth according to claim 18, wherein each of the plurality of flexible "e" shaped blades have first and second lateral sides, a top side and a bottom side, wherein the first and second lateral sides are narrower than the top and bottom sides, and wherein the blades are mounted side by side so that the lateral sides of the blades face one another.

* * * * *